United States Patent
Lee (10) Patent No.: US 9,450,445 B2
(45) Date of Patent: Sep. 20, 2016

(54) METHOD AND APPARATUS FOR WIRELESS CHARGING AN ELECTRONIC DEVICE

(71) Applicant: Samsung Electronics Co., Ltd., Gyeonggi-do (KR)

(72) Inventor: Joohoon Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 357 days.

(21) Appl. No.: 13/974,471

(22) Filed: Aug. 23, 2013

(65) Prior Publication Data

US 2014/0055098 A1    Feb. 27, 2014

(30) Foreign Application Priority Data

Aug. 23, 2012 (KR) ................. 10-2012-0092117

(51) Int. Cl.
*H02J 7/00* (2006.01)
*H02J 7/02* (2016.01)

(52) U.S. Cl.
CPC ................... *H02J 7/025* (2013.01)

(58) Field of Classification Search
CPC ..... H02J 7/0025; H02J 5/005; B60L 11/182; B60L 11/1816; B60L 11/1829
USPC ......................... 320/107–109, 137
See application file for complete search history.

(56) References Cited

U.S. PATENT DOCUMENTS

| | | | |
|---|---|---|---|
| 2007/0103110 A1* | 5/2007 | Sagoo | H02J 7/025 320/109 |
| 2009/0278505 A1 | 11/2009 | Toya et al. | |
| 2010/0156343 A1* | 6/2010 | Jung | H02J 5/005 320/108 |
| 2010/0279606 A1* | 11/2010 | Hillan | H04B 5/00 455/41.1 |
| 2012/0052923 A1 | 3/2012 | Park | |
| 2014/0306657 A1* | 10/2014 | Lundgren | H02J 7/025 320/108 |

FOREIGN PATENT DOCUMENTS

| | | |
|---|---|---|
| CN | 1956288 A | 5/2007 |
| CN | 102157990 A | 8/2011 |
| CN | 102185529 A | 9/2011 |
| CN | 102386639 A | 3/2012 |
| TW | 200943664 A | 10/2009 |
| WO | 2010/093969 A3 | 8/2010 |

OTHER PUBLICATIONS

Chinese Search Report, dated Jun. 29, 2016.

* cited by examiner

*Primary Examiner* — Paul Dinh
(74) *Attorney, Agent, or Firm* — Cha & Reiter, LLC.

(57) ABSTRACT

A wireless charging method for an electronic device using an electromagnetic radiation (EMR) circuit is provided. The wireless charging method includes receiving an event input through the EMR circuit, controlling an input function according to a signal received through the EMR circuit in response to an input event, and controlling a wireless charging of a target device or electronic device using energy generated through the EMR circuit in response to a charge event.

11 Claims, 7 Drawing Sheets

METHOD AND APPARATUS FOR WIRELESS CHARGING AN ELECTRONIC DEVICE

CLAIM OF PRIORITY

This application claims the benefit under 35 U.S.C. §119(a) of a Korean patent application filed on Aug. 23, 2012 in the Korean Intellectual Property Office and assigned Serial No. 10-2012-0092117, the entire disclosure of which is hereby incorporated by reference.

BACKGROUND

1. Field of the Invention

The present disclosure relates to a method and apparatus for charging a user device wirelessly.

2. Description of the Related Art

Portable terminals now provides a calling function such as a voice call and a video call, a message transmission and reception function such as a short message service (SMS), a multimedia message service (MMS) and an e-mail, and other various functions such as an electronic organizer function, a photographing function, a broadcast replay function, a video replay function, a music replay function, an Internet function, a messenger function and a social network service (SNS) function.

The battery of a portable terminal requires charging, which is divided into wired charging and wireless charging. That is, the portable terminal may be charged in a contact-type charge scheme where the battery is charged by an electric contact or in a contactless charge scheme where the battery is charged using magnetic coupling without an electric contact.

The wired charge method is common. Recently a wireless charging system based on a contactless charge scheme by inductive coupling is being developed. Such a wireless charging system supplies power to a charge pad including a coil (hereinafter, referred to as a "first coil"), and charges a battery using an inductive current generated on a coil (hereinafter, referred to as a "second coil") included in a portable terminal or a battery due to a magnetic field generated in the coil. That is, the wireless charging system may readily charge the battery by positioning the portable terminal on the charging pad that generates a magnetic field. The charging pad uses a magnetic material core or a winding wire formed on a printed circuit board (PCB).

However, the charging efficiency of the wireless charge system may vary depending on the location relation between the first coil and the second coil. In other words, the best charging efficiency is realized when the first coil is located to correspond to the second coil in the wireless charge system. That is, the wireless charge system requires the user to locate the portable terminal in a designated place to obtain an optimal charging efficiency which may be inconvenient to the user. In order to solve the problem, pluralities of first coils have been mounted or a large-size first coil has been formed to cover the entire area of the charging pad. However, according to this method, the wireless communication performance of the portable terminal is deteriorated due to the influence of the magnetic field generated by the first coil, and the performance and lifespan of parts of the portable terminal may be influenced due to the magnetic field on a high and wide area. Hence, there is a need for a method and system for wirelessly charging a battery capable of securing stability of a portable terminal and optimizing the charging efficiency without deteriorating the wireless communication performance of the portable terminal.

Further, the wireless charge scheme according to the conventional wireless charge system must necessarily include a dedicated charging pad, which is connected to a wall socket using a plug. Hence, in the conventional wireless charge system, the battery of a portable terminal cannot be charged when there is no dedicated charging pad or no power outlet for operating the dedicated charging pad.

SUMMARY

The present invention has been made in view of the above problems and provides additional advantages, by providing a method and apparatus for wirelessly charging a user device battery using another device. The present invention further provides a method and apparatus for wireless charging an electronic device while minimizing the effect on the performance of the electronic device and maintaining the optimal charging efficiency regardless of the location of the electronic at the time of charging.

The present invention further provides a method and apparatus for wireless charging an electronic device capable of performing wireless charging, by maintaining the power transmission efficiency regardless of location where the electronic device is positioned on another device during charging.

The present invention further provides a method and apparatus for wireless charging an electronic device capable of supporting a simultaneous multi charging of one or more devices by detecting the location where an electronic device approaches (or contacts) and securing a part of the entire charging area of the surface of the electronic device as a charging effective area.

The present invention further provides a method and apparatus for wireless charging an electronic device capable of distinguishing an input mode and a charging mode in relation with another device, so that receiving power from another device or supplying power to another device can be selectively achieved.

The present invention further provides a method and apparatus for wireless charging an electronic device while enhancing user convenience and usability of the electronic device by implementing an optimal environment for supporting a wireless charging.

In accordance with an aspect of the present invention, a wireless charging method of an electronic device having an electromagnetic radiation (EMR) circuit includes: determining a mode of operation based on an input sensed by the EMR circuit; controlling, when the mode is an input mode, an input function according to a signal received through the EMR circuit in response to the input mode; and controlling, when the mode is a charging mode, a wireless charging using energy generated through the EMR circuit in response to the charging mode.

In accordance with another aspect of the present invention, there is provided a computer-readable recording medium on which a program for executing the method in a processor is recorded.

In accordance with another aspect of the present invention, an electronic device includes: a charge unit for generate a magnetic field for supporting a wireless charging of a target device or for inducing a magnetic field supplied from a source device; and a controller for identifying an event sensed by the charge unit, for controlling an input function based on a signal received via the charge unit in response to an input event, and for controlling the wireless charging in response to a charging event.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The present invention relates to a method and apparatus for providing a wireless charging of a user device or an electronic device such as portable terminal, mobile station, Personal Digital Assistant (PDA), tablet PC, and etc.

Briefly, according to an embodiment of the present invention, the user device can support a pen input using an electromagnetic radiation (EMR) technology, so that a wireless charging between devices may be realized using an EMR circuit. According to the present invention, the wireless charging may be supported by providing certain frequencies (or magnetic field) generated through the coil mounted on a device or a sensor such as an EMR circuit of the device.

Further, according to an embodiment of the present invention, a user device may detect the location of another device (e.g., a portable terminal, an electric pen, etc.) through a charging circuit (e.g., an EMR circuit) during a charging mode, and may wirelessly supply energy for wireless charging of another device by operating a portion of the charging circuit corresponding to the detect location. EMR is a form of energy emitted and absorbed and carries energy (i.e., radiant energy) through space continuously away from the source and has both electric and magnetic field components.

Further, according to an embodiment of the present invention, when the device detects an approach of another device through the charging circuit, the device may distinguish an input mode and charging mode in relation with another device. When the device determines operation by the charging mode from relation of another device, may be performs internal charging of the device using power wirelessly received from another device through the charging circuit of the device in the charging mode.

In the embodiment, the charging mode may be divided into an energy supply mode that supports the charging of another device and an energy reception mode that receives charging energy from another device. Hence, when another device is approached (or contacted) during the energy supply mode is detected, wireless charging of another device may be supported. Also, when another device identified as an electric pen is approached (or contacted) during the energy reception mode, the user device may operate at an input mode, receive the input of the electric pen, and then process an operation according to the input. If another device corresponds to the charging pad is approached (or contacted), the user device may operate at a charge mode, receive power from the charging pad, and process the wireless charge.

Hereinafter, the configuration of a user device and the method of controlling the operation according to an embodiment of the present invention will be described with reference to the drawings below. However, it should be noted that the configuration of the user device and the method of controlling the operation according to an embodiment of the present invention are not limited to the description below, and may be applied to various other embodiments based on the teachings described below.

Figure 1:
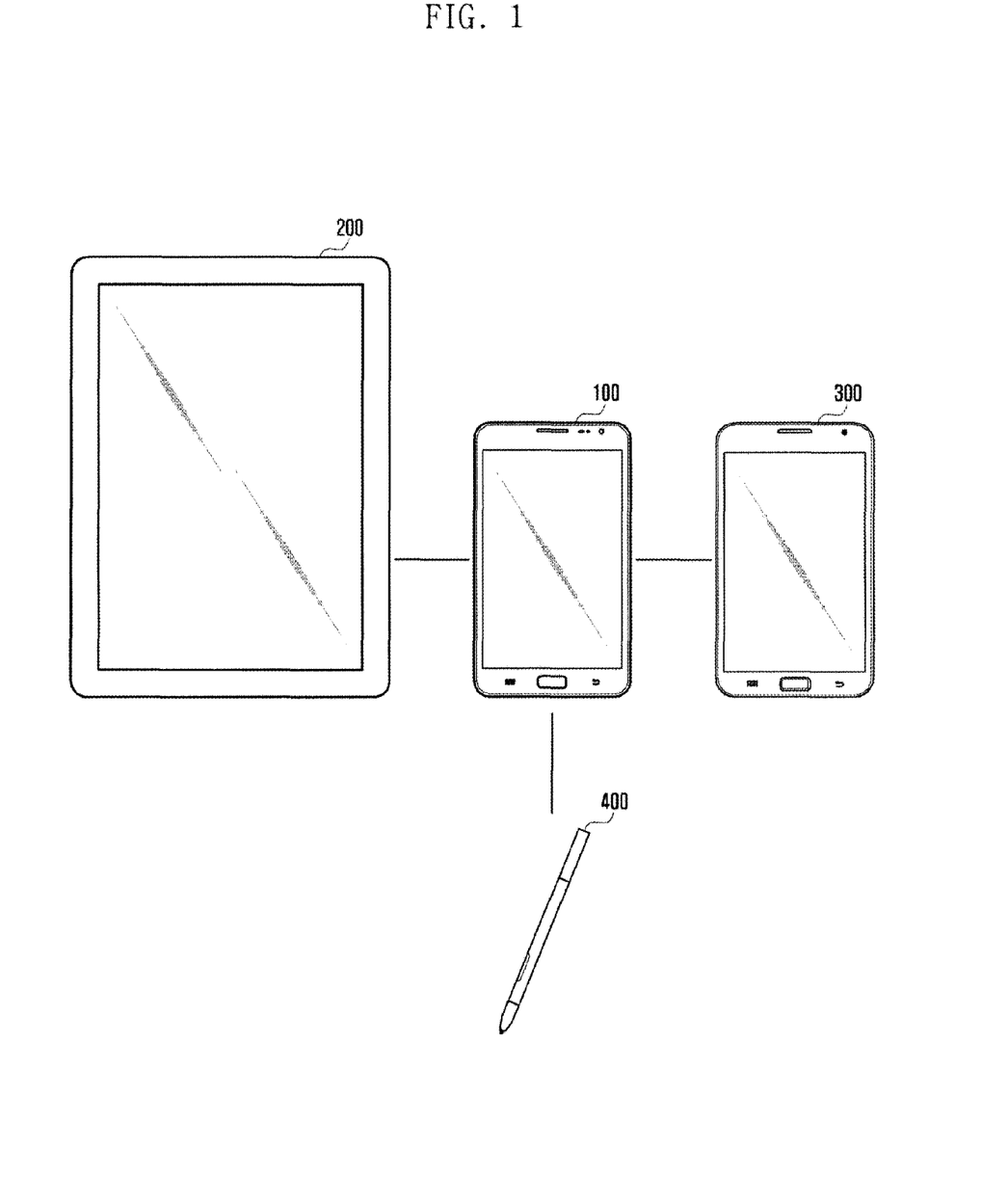
FIG. 1 schematically illustrates an operation of wireless charging according to an embodiment of the present invention.

FIG. 1 schematically illustrates an operation of wireless charging according to an embodiment of the present invention.

FIG. 1 illustrates a case of using a first device 100 to a fourth device 400 to explain the wireless charging operation of the present invention.

The first device 100 represents a device that operates as a source device that wirelessly supplies energy (power) for charging another contacted (or approached) device, or The first device 100 represents a device that operates as a target device that wirelessly receives energy for charging from another device and charges using the received energy. In the present invention, the first device 100 may represent a portable terminal such as a tablet PC and a smartphone, or other electronic mentioned earlier.

The second device 200 represents a device that supplies energy for charging the first device 100 in response to contacts (or approaches) of the first device 100. That is, the second device 200 may operate as the source device that supplies energy and may be a tablet PC or a wireless charge pad. In operation, the second device 200 may detect the location of the first device 100 detected on the surface thereon using the EMR circuit in response to a magnetic signal received from the first device 100 surface, activate a charged area (i.e., a valid charge area) corresponding to or defined by the detected location, and then supply energy to the first device 100 through the activated charged area.

The third device 300 may represent a portable terminal similar to the first device 100 or another form of portable terminal. In the present invention, the third device 300 may operate as the target device that receives energy for charging by contacting (or approaching) the first device 100. In the present invention, the third device 300 may represent a portable terminal such as a smartphone, a tablet PC, a media player (e.g., an MP3 player, etc.), a PDA, a Bluetooth headset, or other electronic device.

The fourth device 400 represents a device or an electric pen that supports an input function of the first device 100 by contacting (or approaching) the first device 100. The fourth device 400 may operate as a device that transmits and receives wireless signals for the input function control when contacting (or approaching) the first device 100 or operate as the target device to receive charging energy from the first device 100.

In operation, when the first device 100 operates as the target device, the first device 100 may charge its internal battery by receiving energy generated from the source device (e.g., the second device 200). Further, when the first device 100 operates as the source device, the first device 100 may support the wireless charging of another target device by transmitting energy to the target device (e.g., the third device 300, the fourth device 400, etc.).

In particular, the first device 100 implemented with the EMR circuit detects a location (area) where the target device is overlaid on the surface (or LCD surface) thereof using signals sensed by the EMR circuit, and traces a specific charging area corresponding to the detected location of the target device. The first device 100 determines the traced charged area as a valid charging area, and activates only the valid charging area among its entire surface area of the first device 100. Then, the first device 100 supports the wireless charging by supplying energy to the target device only through the activated valid charge area.

Further, the first device 100 is configured to provide an input mode or a charging mode depending on the type of an event detected from another device, and may perform an input function or charging function based on one of the modes.

For example, when it is determined that the detected event is an input mode, the first device 100 may process an input function according to a control command from another device. For example, when a user operates the first device 100 using the fourth device 400 (i.e., the electric pen), the first device 100 may determine that an input mode is being performed by the fourth device 400 through a signal at a certain frequency transmitted from the fourth device 400, and may perform an input function by the signal received from the fourth device 400.

Further, when a user establishes a wireless communication (e.g., data transmission and reception by a wireless local area network (WLAN) formation, data transmission and reception by a Bluetooth network formation, etc.) with the third device 300 (e.g., a smartphone, media player, Bluetooth headset, etc.), the first device 100 may determine that an input mode is being performed for data transmission and reception with the third device 300, and may perform the data transmission and reception functions with the third device 300.

Further, when it is determined that the detected event is a charging mode, the first device 100 may receive an electric charging energy from another device for charging its internal battery. The first device 100 may convert the received electric charging energy into an internal energy in the charging mode, and perform the internal battery charge by the converted internal energy.

In particular, in an exemplary embodiment of the present invention, when the first device 100 utilizes an EMR technology, the operation of the EMR circuit implemented in the first device 100 is divided into an operation for supporting an input mode of an electric pen and an operation for receiving energy from another device (i.e., source device such as second device 200 or third device 300).

Hence, when the operation is an EMR operation for an input by an electric pen that the mode is determined as an input mode, the first device 100 may control an input operation by the electric pen. Also, when the operation is an operation for reception of energy supplied from the source device that the mode is determined as and charging mode, the first device 100 to control the charge operation by energy supplied from the source device.

The first device 100 surface incorporates a sensor board that detects the electric pen's movement. During the input mode, weak energy is induced in the electric pen's resonant circuit by a magnetic field generated by the sensor board surface. The pen's resonant circuit then makes use of this energy to return a magnetic signal to the sensor board surface of the first device 100. Similarly, the first device 100 receives energy supplied from another device's resonant circuit using a magnetic field generated from another device surface and then makes use of the energy to charge its internal battery. That is the energy supplied from the source device is stored as a magnetic field in the coil of the EMR circuit which is converted into electric energy (flowing current), and the converted electric energy may be converted into a form (e.g., rectification and power storage) suitable for charging the internal battery of the first device 100.

Here, the method of distinguishing a detection of between the electric pen and the another device (i.e., source device such as second device 200 or third device 300) by the first device 100 may be achieved by measuring the size of an area defined by energy induced surface which is detected through the EMR circuit or by measuring the frequency band received thereon. For example, the electric pen may be determined to be detected by the first device 100 when a magnetic signal is detected only in a partial surface area of the first device 100 surface incorporating the EMR circuit. Further, the source device may be determined to be detected by the first device 100 when a magnetic signal is detected in an entire surface area of the first device 100 surface incorporating the EMR circuit. Meanwhile, another device may be determined to be detected by the first device 100 when a magnetic signal covering the entire first device surface is detected.

Further, according to an embodiment of the present invention, when contacted (or approached) by an external device, the first device 100 may sense one of following events: (1) a first charge event (energy reception mode) that charges the battery of the first device 100; (2) a second charge event (energy supply mode) for charging the external device; (3) an input event (input mode) for an input function by an electric pen; and (4) a wireless communication connection event (input mode) for data exchanges with the external device. Here, when the energy is distributed and detected on the entire first device 100 surface, the first charge event is determined, but if only detected on a portion of the first device 100 surface, the second charge event is determined.

If it is determined that the first device 100 senses (1) the first charge event, the first device 100 may receive energy generated from the external device via its EMR circuit. That is, the first device 100 may receive the external energy by utilizing the EMR circuit as an electromagnetic induction means by converting the energy received thereon through the EMR circuit into power used for battery charging. To this end, the energy supplied from the external device is stored as a magnetic field in the coil of the EMR circuit which is converted into electric energy (flowing current), and the converted electric energy may be converted into a form (e.g., rectification and power storage) suitable for charging the internal battery of the first device 100.

If it is determined that the first device 100 senses (2) the second charge event, the first device 100 generates a magnetic field by utilizing the EMR circuit as an electromagnetic field generation means, and wirelessly transmits energy to the external device using the generated magnetic field as a magnetic resonance scheme (or magnetic induction scheme). Here, when the charging the external device is supported, the first device 100 may detect the location (area) where the external device correspond on the surface of the first device 100. Here, the location detection operation may be similar to detecting the location of the external device according to the electric pen location recognition technology using the EMR described earlier. Further, the first device 100 may support the charging by operating (i.e., magnetic field generation) only on the charged area (or valid charge area) where the external device is detected amongst entire charging surface of the first device 100. Hence, according to an embodiment of the present invention, the first device 100 may respectively detect a plurality of locations defined by a plurality of external devices detected thereon, and may support a multi-charge by generating the magnetic field only on a plurality of valid charging areas corresponding to the respective detected location.

If it is determined that (3) the input event is detected, the first device 100 may detect the location of an external device based on the electric pen recognition technology using the EMR described earlier, and control the input function based on the recognition technology. Further, the first device 100 may perform a requested wireless communication connection and perform data transmission and reception with the external device, in response to a connection signal (e.g., a wireless LAN link formation, data transmission and reception request, etc.) request.

Figure 2:
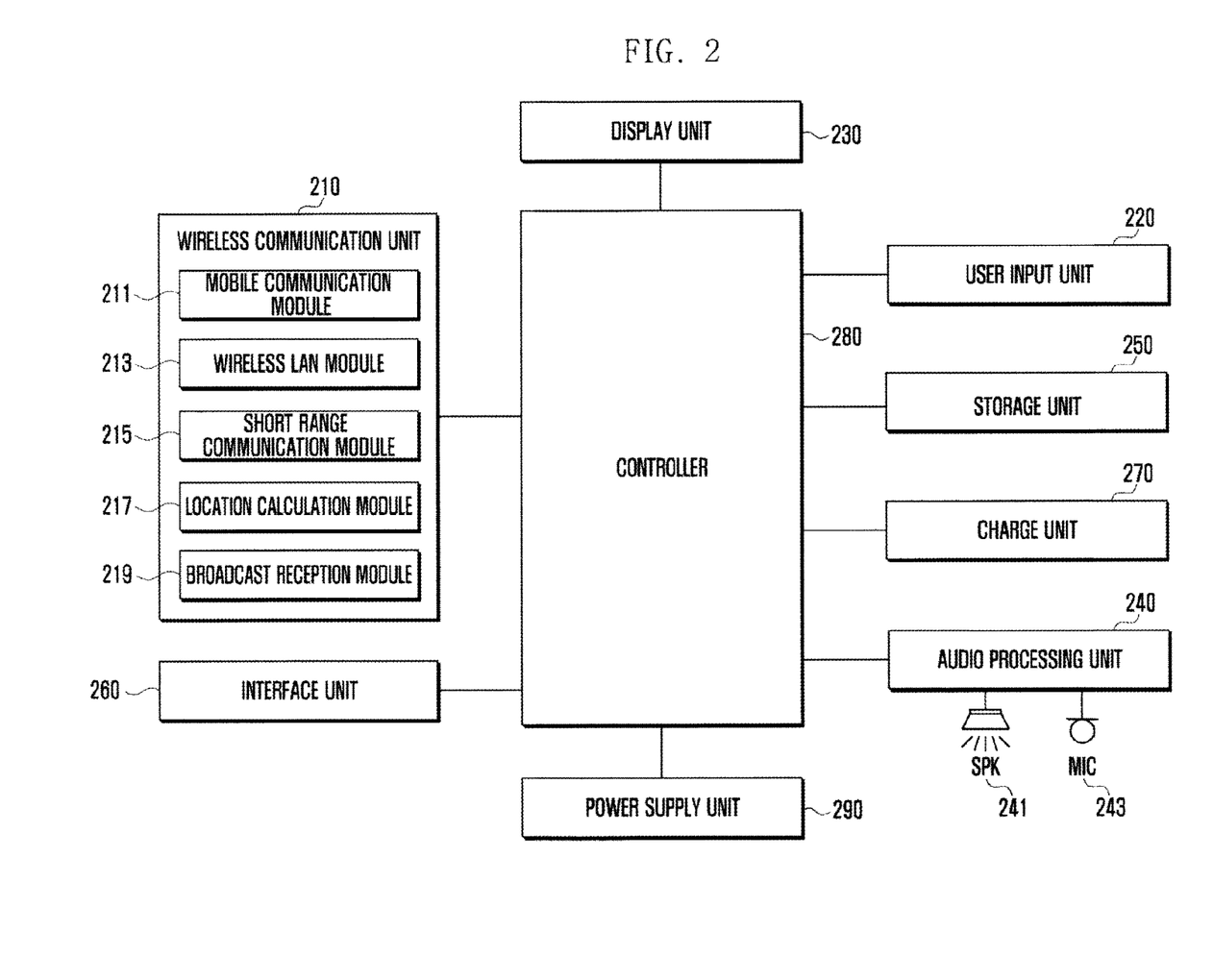
FIG. 2 schematically illustrates a configuration of a user device according to an embodiment of the present invention.

FIG. 2 schematically illustrates a configuration of a user device according to an embodiment of the present invention.

Referring to FIG. 2, the user device of the present invention includes a wireless communication unit 210, a user input unit 220, a display unit 230, an audio processing unit 240, a storage unit 250, an interface unit 260, a charge circuit 270, a controller 280, and a power supply unit 290. The components of the user device of the present invention illustrated in FIG. 2 may be implemented with more or less components. For example, when the device according to an embodiment of the present invention does not need a separate communication function, the configuration of the wireless communication unit 210 may be omitted.

The wireless communication unit 210 may include one or more modules that allow wireless communication between the device and the wireless communication system or between the device and a network where another device is located. For example, the wireless communication unit 210 may include a mobile communication module 211, a wireless local area network (WLAN) module 213, a short range communication module 215, a location calculation module 217, a broadcast reception module 219, etc.

The mobile communication module 211 transmits and receives wireless signals with at least one of the base station, the external device and the server on the mobile communication network. The wireless signal may include data of various forms according to transmission and reception of a voice call signal, a video call signal or a text/multimedia message.

The wireless LAN module 213 represents a module for wireless Internet connection and for forming a wireless LAN link, and may be internally or externally installed in the device. Some examples of the wireless Internet technology are Wi-Fi, wireless broadband (Wibro), world interoperability for microwave access (Wimax) and high speed downlink packet access (HSDPA). When a wireless LAN link is established with another device, the wireless LAN module 213 may transmit or receive data according to user's selection to or from another device.

The short range communication module 215 represents a module for short range communication. Some examples of the short range communication are a Bluetooth, radio frequency identification (RFID), infrared data association (IrDA), ultra wideband (UWB), ZigBee and a near field communication (NFC). Further, when a short range communication is connected with another device, the short range communication module 215 may transmit or receive data according to user's selection to or from another device.

The location calculation module 215 is a module for obtaining the location of the device, and a representative example is a global positioning system (GPS) module. The location calculation module 215 may produce three-dimensional current location information according to latitude, longitude, and altitude by calculating distance information from three or more base stations and accurate time information and then applying trigonometry to the calculated information. Further, the location calculation module 215 may produce location information by continually receiving the current location of the device from three or more satellites in real time. The location information of the device may be obtained by various methods known to artisans in this art.

The broadcast reception module 219 receives a broadcast signal (e.g., a TV broadcast signal, a radio broadcast signal, a data broadcast signal, etc.) and/or the broadcast-related information (e.g., a broadcast channel, a broadcast program or information related with the broadcast service provider) from an external broadcast management server through a broadcast channel (e.g., a satellite channel, a ground wave channel, etc.).

The user input unit 220 generates input data for controlling operation of the device. The user input unit 220 may include a keypad, a dome switch, a touch pad (static voltage/static current), a jog wheel, a jog switch, etc. The user input unit 220 may be implemented as an external button of a device, and some buttons may be implemented with a touch panel.

The display unit 230 displays (outputs) information which is processed during various modes of operation in the device. For example, when the device is being operated in a calling mode, the calling-related user interface (UI) or graphic user interface (GUI) is displayed. Further, when the device is being operated in a video call mode or a photography mode, the display unit 230 displays a photograph and/or received image or UI and GUI. In particular, the display unit 230 may display various UIs and GUIs related with the operation of the wireless charge function. For example, the display unit 230 may display related UIs and GUIs for guiding the target device to be placed at an appropriate location for charging of the target device when operating the wireless charging function.

The display unit 230 may include at least one of a liquid crystal display (LCD), a thin film transistor LCD (TFT LCD), a light emitting diode (LED), an organic LED (OLED), an active matrix OLED (AMOLED), a flexible display a bended display and a 3D display. Here, some displays may be implemented as a transparent display composed of an externally visible transparent type or optical transparent type.

Further, when a touch panel that senses a touch operation with respect to the display unit 230 forms a mutual layer structure (hereinafter, referred to as a "touch screen"), the display unit 230 may be used as an input device as well as an output device. The touch panel may be configured to convert a pressure applied to a certain region of the display unit 230 or a change of capacitance, etc. generated in a certain region of the display unit into electric input signals. The touch panel may be configured to detect not only a location and area, but also a pressure at the time of a touch. When there is a touch input for the touch panel, the corresponding signals are transmitted to a touch controller (not shown). The touch controller (not shown) processes the signals and transmits the corresponding data to the controller 280. As such, the controller 280 may know which part of the display unit 230 has been touched.

The audio processing unit 240 transmits an audio signal which is received from the controller 280 to the speaker 241, and performs a function of transmitting an audio signal such as a voice signal which is received via the microphone 243, to the controller 280. The audio processing unit 240 may convert voice/sound data into audible sounds and output the sounds through a speaker 241 based on a control of the controller 280, and may convert audio signals, such as sounds received from the microphone 243, into digital signals, and then transmit the converted signals to the controller 280.

The speaker 241 may output audio data which is received from the wireless communication unit 210 or stored in the storage unit 250 when the device is being operated in any of various modes, such as, for example, a calling mode, a recording mode, a media content replay mode, a broadcast reception mode, etc. The speaker 241 may output sound signals related with the function performed in the device (e.g., a call connection reception, a call connection transmission, a music file replay, a movie file replay, a wireless charge, etc.). In the present invention, the speaker 241 may output a sound signal that notifies the start of charging according to the first charge event (energy receiving mode) or second charge event (energy supply mode) as described above when the wireless charge function is operated according to control of the controller 280 for the audio processing unit 240. Further, the speaker 241 may output a sound signal, etc. that notify the termination of the charge in the first charge event (energy receiving mode) according to control of the controller 280 for the audio processing unit 240.

The microphone 243 receives externals sound signals and processes the received sound signals as electric voice data when the device is being operated in any of various modes, such as, for example, a calling mode, a recording mode, a voice recognition mode and a photographing mode, etc. In the case of the calling mode, the processed voice data may be converted into a form that may be transmitted to the mobile communication base station, and be outputted. Further, various noise removing algorithms for removing noises generated in the process of receiving external sound signals may be implemented in the microphone 243.

The storage unit 250 may store a program for processing and controlling the controller 280, and may temporarily store inputted and outputted data (e.g., a phone number, a message, a media content (e.g., a music file, a moving image file), an electronic book, etc.). The user frequency (e.g., an application use frequency, media content replay frequency, and use frequency of phone number, message and multimedia), importance and priority (preference) according to the function operation of the device may also be stored. The storage unit 250 may store data related with sounds and vibrations of various patterns outputted at the time of a touch input on a touch screen. In particular, the storage unit 250 may store at least one program that performs a function related with the wireless charge of the present invention.

The storage unit 250 may include a storage medium of at least one of a flash memory type, hard disk type, micro type, card type (e.g., a SD card or XD card) memory, and a random access memory (RAM), static RAM (SRAM), read only memory (ROM), programmable ROM (PROM), electrically erasable PROM (EEPROM), magnetic RAM (MRAM), magnetic disk and optical disk type memory. The device may be linked with the web storage that performs the storage function of the storage unit 250 for operation.

The interface unit 260 plays a role with all external devices connected to the device. The interface unit 260 may receive data from an external device, transmit supplied power to each of the internal components, and transmit the internal data of the device to the external device. For example, the interface unit 260 may include a wired/wireless headset port, an external charger port, a wired/wireless data port, a memory card port, a port for connecting a device including an identification module, an audio input/output port, a video input/output port, an earphone port, etc.

The charge unit 270 is controlled by the controller 280, and the charge unit 270 may operate as a means for generating a magnetic field or a means for inducing a magnetic field according to control of the controller 280 to support wireless charging of the target device. In an exemplary embodiment of the present invention, the charge unit 270 may be implemented using the EMR circuit, or may be implemented in a manner that includes a separate charge circuit on the EMR circuit.

The charge unit 270 may generate a magnetic field using current supplied to generate a magnetic field having predetermined shape and intensity (e.g., a magnetic resonance scheme or magnetic induction scheme) when operated as a magnetic field generation means. The charge unit 270 may include coils and magnetic materials for constituting a charged area. Here, the magnetic material may be designed for a low magnetic reluctance, i.e., easy passage of the magnetic flux, and may be implemented under the surface one or more charge areas or the entire charge area. That is, the magnetic material may be in charge of guiding the magnetic flux. The charge unit 270 may include a plurality of coils (e.g., a first coil, a second coil, etc.) which are independently operated, and a plurality of coils may be implemented such that energy may be supplied regardless of the orientation where the target device is placed on the charge area, and may be implemented in a crossing scheme of a layer structure.

When there is no target device in the charge mode, the charge unit 270 may automatically omit the operation according to the control of the controller 280. When there is a target device in the charge area, energy for charging the target device is supplied by generating a magnetic field according to a change in the magnetic flux and flowing current on the valid charge area where the target device is placed according to the control of the controller 280. Further, when two or more target devices are placed on the charge area, the charge unit 270 may be implemented to simultaneously supply power by generating a magnetic field by the change of the magnetic flux by flowing electric current according to a level (e.g., a higher level) that is different form the case where one target device is placed.

The charge unit 270 may serve as a sensing unit. That is, the charge unit 270 may sense a signal received from the target device, transmit the sensed signal to the controller 280, and may allow the signal to be analyzed and processed. For example, the charge unit 270 allows a selective charge operation corresponding to the location of the target device by sensing the target device during the charge mode.

When operated as the magnetic induction means, the charge unit 270 may induce and receive energy that is generated and supplied in the charge unit of the target device. Further, the charge unit 270 may perform the internal charging of its internal battery using the received energy. That is, the charge unit 270 may receive the energy by magnetic induction from another device, and may charge the battery using the magnetic field received thereon. The charge unit 270 may convert energy, which is supplied from the target device and is stored in the magnetic field, into electric energy (flowing current), and convert the electric energy into a form that is useful to the user device.

The charge unit 270 may distinctively support the transmission and reception mode for data transmission and reception when operated as a magnetic induction means, and a charging mode for the wireless charging operation. For example, the charge unit 270 may sense signals, which are generated by the source device's operation at the charging mode, and transmit the signals to the controller, and may operate at the charging mode according to control of the controller 280. Further, the charge 270 may sense signals, which are generated by the source device's (e.g., an electric pen) operation at the transmission and reception mode, and transmit the signals to the controller 280, and may operate during data transmission and reception according to control of the controller 280.

The controller 280 controls overall operation of the device. For example, the controller 280 may perform control related with a voice call, data communication and video call, etc. The controller 280 may also include a multimedia module (not shown) for operation of the function as in the multimedia replay. In the present invention, the multimedia module (not shown) may be implemented within the controller 280, and may be implemented separately from the controller 280.

In particular, the controller 280 may also control the operation of the function related with the wireless charging. For example, the controller 280 may divide the charging mode (energy reception mode, energy supply mode) and the input mode as described above, and the performance of operation according to the divided modes may be controlled. The controller 280 may control operation of the charge unit 270 at the charging mode, and may control overall operation for the internal device charge or external device charge according to the charge event (e.g., a first charge event or a second charge event). Further, the controller 280 may control the operation for location detection of at least one device on the surface of the display unit 280 at the time of supporting the wireless charge of the external device according to the second charge event (energy supply mode), and may control the determination of the valid charge area for the wireless charge of at least one external device and the charge operation based on the determined valid charge area.

The controller 280 may distinguish an event inputted through the charge unit 270 by executing at least one program stored in the storage unit 250, control the input function based on the signal received through the charge unit 270 when the event is an input event, and control the wireless charge using the energy generated through the charge unit 270 when the event is a charge event. Here, the controller 280 may distinguish the event using at least one of the distribution of the area sensed in the charge unit 270 (particularly, the EMR circuit) and the frequency band inputted through the charge unit 270.

When the event is a charging event, the controller 280 may distinguish whether the charging event is a first charge event of the energy reception mode that charges the internal battery or a second charge event of the energy supply mode that supports the charge of the target device. Here, when the charging event is distributed and detected on the entire charge area by the charge unit 270, the controller 280 determines the event as the first charge event, and when the charging event is distributed and detected only on a part of the charge area in a line or surface form, the controller 280 determines the event as the second charge event.

The controller 280 may enter a charge mode for receiving energy generated in the source device in response to the first charge event, and may control the internal charge using the magnetic field induced from the source device through the EMR circuit in the charge mode. Further, the controller 280 may enter the charge mode for supplying energy to the target device in response to the second charge event, determine the valid charge area for charging the target device at the charge mode, and control the generation of the magnetic field by the determined valid charge area.

The power supply unit 290 receives internal and external power and supplies power necessary for operating each component by the control of the controller 280. The power supply unit 290 may convert supplied power into direct current power, and may supply an appropriate voltage to the device.

Further, various embodiments described in the present invention may be implemented within a recording medium that may be readable by a computer or the like using software, hardware or a combination thereof. According to hardware implementation, the embodiments described in the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the present specification may be implemented by the controller 280. According to the implementation by software, the embodiments as in the procedure and function described in the present specification may be implemented as a separate software module. Each of the software modules may perform one or more functions and operations described in the present specification.

Here, the recording medium distinguishes the event inputted through the EMR circuit, controls the input function based on the signal received through the charge unit at the time of an input event, controls internal charge using the magnetic field induced from the source device through the EMR circuit at the charge mode for receiving energy generated in the source device if the event is a first charge event of the energy reception mode, determines the valid charge area for charging the target device at the charge mode for supplying energy to the target device if the event is a second charge event of the energy supply mode, and may be read by a computer having recorded a program for processing generation of the magnetic field by the determined valid charge area.

Further, the device of the present invention shown on FIG. 2 may include all devices that use an application processor (AP), a graphic processing unit (GPU), and a central processing unit (CPU), such as all information communication devices, multimedia devices and application devices thereof that support the function of the present invention. For example, the device may include devices such as a tablet, a personal computer (PC), a smartphone, a digital camera, a portable multimedia player (PMP), a media player, a portable game console, a laptop computer, and a personal digital assistant (PDA) as well as mobile communication terminals operated according to respective communication protocols corresponding to various communication systems. Further, the method of controlling the function of the present invention may be applied to various display devices such as a digital TV, a digital signage, and a large format display (LFD).

Figure 3:
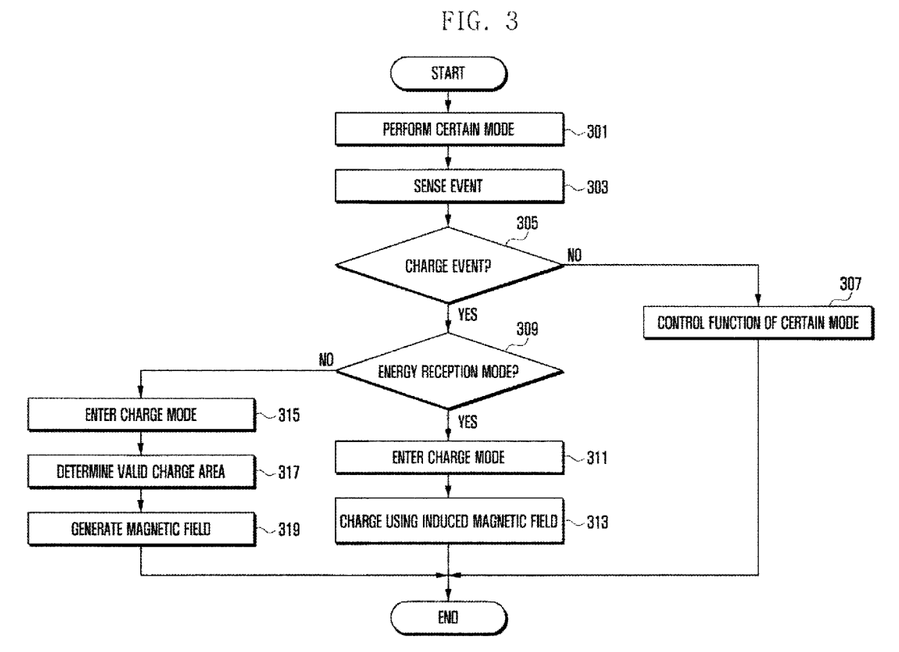
FIG. 3 is a flowchart illustrating a method of performing an operation in a user device according to an embodiment of the present invention.

FIG. 3 is a flowchart illustrating a method of performing an operation for each even in a user device according to an embodiment of the present invention.

Referring to FIG. 3, the controller 280 may sense an event (303) during performance of a certain mode (301). Here, the certain mode may include one of various modes performed in the user device, such as a standby mode, an execution mode for executing a certain application (e.g., a broadcast reception mode, a media replay mode, a message writing mode, a drawing mode, etc.). Further, the event represents an event sensed through the EMR circuit implemented in the user device. Hence, the controller 280 may sense an event generated through the EMR circuit during performance of a certain mode as described above.

When an event is sensed, the controller 280 determines whether the event corresponds to the charging event or an input event (305). That is, the controller 280 distinguishes the event type, and determines whether the event corresponds to a charging event for the internal or external wireless charge, or whether the event corresponds to the input event for data transmission and reception. Here, the controller 280 may check the event type through the distribution of the area where the event is sensed on the EMR circuit. For example, the when the event is detected as having the distribution of a certain point form through the coil that constitutes the EMR circuit, the controller 280 may determine that the event is an input event by the electric pen, etc. Further, when the event is detected as having a distribution of a certain line or polygon form through the coil that constitutes the EMR circuit, the controller 280 may determine that the event is a charging event.

Further, the controller 280 may identify the event type by identifying the frequency band received through the EMR circuit. For example, the frequency generated for the performance of the input function in the electric pen and the frequency generated for the charge in the device may be different in the bandwidth. Hence, the user device may divide the charge event and the input event according to the frequency band inputted through the EMR circuit. That is, according to an embodiment of the present invention, the event type may be distinguished using at least one of the frequency bands inputted through the EMR circuit and the distribution of the area sensed in the EMR circuit.

If it is determined that the event is not a charging (as indicated by No with respect to step 305) event but an input event, the controller 280 controls the function of the certain mode that is being performed (307). For example, user may generate an input for controlling the mode function by contacting (or approaching) the electric pen on the user device. Then, the controller 280 may receive the signal generated from the electric pen at a certain mode, may trace the location where the signal has been received, and may control to limit the performance of the function at the location.

For example, the user device may provide a more delicate and minute pen input (touch) through the EMR circuit embedded in the display unit 230 and the electric pen of an active type. That is, a separate battery or electricity does not flow in the electric pen in the user device, and the user device may provide a sense of using an actual pen by sensing the writing pressure, speed and coordinate information of the pen while the coils in the pen transmits and receives certain frequencies from the EMR circuit of the user device.

If it is determined that the event is a charging event (as indicated by Yes with respect to step 305), the controller 280 determines whether the charge event corresponds to a charging event of the energy reception mode or the energy supply mode (309). That is, the controller 280 determines whether the charging event corresponds to an internal charge event that charges the battery of the user device by the source device or whether the charge event corresponds to an external charge event that charges the target device by the user device by distinguishing the type of the charging event.

Here, the controller 280 may identify the type of the charging event through the distribution of the area where the charging event is sensed in the EMR circuit. For example, the controller 280 may determine that the charge event is an internal charge event which is the energy reception mode when the charging event is distributed and detected on the entire area of the EMR circuit embedded in the display unit 230. Further, the controller 280 may determine that the charging event is an external charge event which is the energy supply mode when the charge event is distributed and detected on a part of the EMR circuit embedded in the display unit 230 in a line or polygon form.

If it is determined that the charge event is an energy reception mode (as indicated by Yes with respect to step 309), the controller 280 controls the conversion into the charge mode for receiving the energy induced from the source device at the certain mode (311). The controller 280 controls the internal charge using the magnetic field induced from the source device at the charge mode (313). For example, the user may place the user device at one area on the pad. Then, the pad generates the magnetic field by magnetic resonance or magnetic induction by operating the valid charge area where the user device is placed, and the user device induces and receives the magnetic field generated from the valid charge area of the pad through the EMR circuit embedded in the display unit 230. Further, the user device may convert the received magnetic field into the electric energy (flowing current), and may charge the battery by converting the converted electric energy into a form that is useful to the user device.

If it is determined that the charge event is not an energy reception mode (as indicated by No with respect to step 309) but corresponds to the energy supply mode, the controller 280 controls the conversion into the charge mode for the energy supply to the target device at the certain mode, i.e., the entrance to the charge mode (315). Further, the controller 280 determines the valid charge area for the charge of the target device (317), and generates the magnetic field by the determined valid charge area (319). The generated magnetic field may be induced by at least one target device placed on the display unit 230 of the user device, and the target device may be charged by the induced magnetic field.

For example, the user may place at least one target device on one area on the surface of the display unit 230 of the user device. Then, the user device may detect the location of the target device through the target device scanning using the EMR circuit within the display unit 230. Further, the user device may determine the charged area corresponding to the location of the detected target device as the valid charge area, and may supply the driving current in the valid charge area so as to generate the magnetic field. Further, the user device may generate the magnetic field by the magnetic resonance or magnetic induction. The target device placed on the surface of the display unit 230 of the user device may induce and receive the magnetic field generated by the user device, and may charge the battery by rectification and power storage through the received magnetic field.

Figure 4:
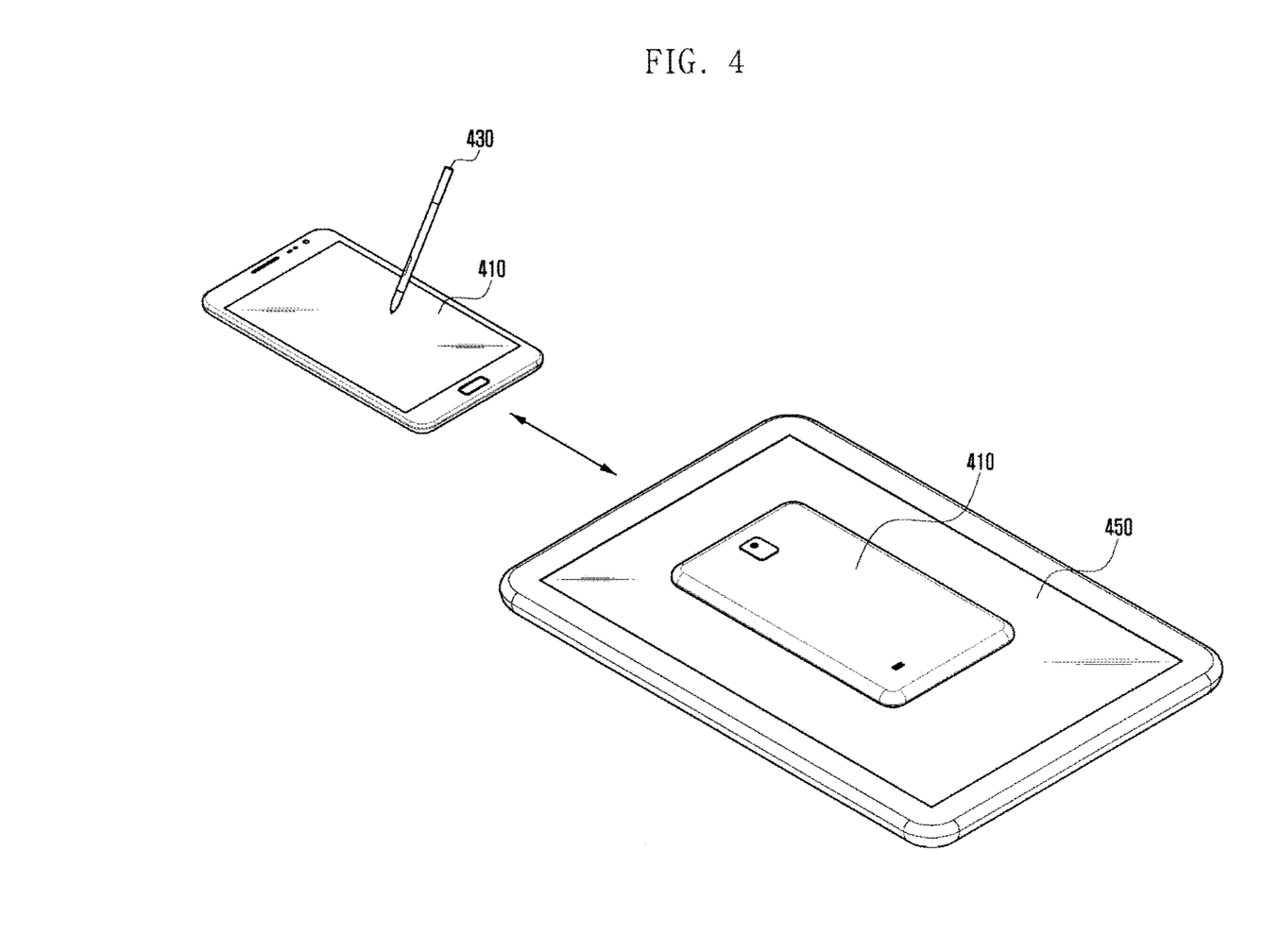
FIG. 4 illustrates a wireless charging operation in a user device according to an embodiment of the present invention.

FIG. 4 illustrates a wireless charge operation in a user device according to an embodiment of the present invention.

In particular, FIG. 4 shows an example where a user device performs an input function according to a signal inputted from an external device at an input mode or performs a charge using energy supplied from the external device at the charge mode.

As illustrated in FIG. 4, the user device 410 according to an embodiment of the present invention may determine an input mode and a charge mode according to an external event sensed through the charge unit 270 (particularly, the EMR circuit), and may control performance of the determined mode. Here, the device of reference numeral 410 may correspond to the first device 100, and it is assumed in FIG. 4 that the device is a smartphone or a tablet PC (hereinafter, the user device) that supports the input function by the electric pen in FIG. 4. The device of reference numeral 430 may correspond to the fourth device 400 as described above, and it is assumed in FIG. 4 that the device is an electric pen that supports the external input by being linked with the device. The device of reference numeral 450 may correspond to the second device 200, and it is assumed that the device is a tablet PC or charge pad that supports the wireless charge in the device 310.

Referring to FIG. 4, when an event is sensed through the EMR circuit, the user device 410 may determine the type of the event. For example, the user device 410 may determine whether the event corresponds to an input event by the electric pen 430 or a charge event by the pad 450.

Here, the user device 410 may divide the event type according to the distribution level of the area where the event is sensed based on the EMR circuit. That is, the user device 410 may divide the event type according to whether detected based on the point through the EMR circuit or whether detected based on the area as in the line or polygon. That is, the user device 410 supports a pen input using the EMR technology as illustrated in FIG. 4, and in order to support the pen input, the user device 410 allows the sensing of the input of the electric pen by the lamination of the EMR circuit under the display unit. Hence, as illustrated in FIG. 4, the user device 410 may distinguish whether the external device that contacts (or approaches) the surface of the display unit is detected throughout the entire area of the EMR circuit or is detected through only a part of the area.

For example, as illustrated in FIG. 4, when a signal is generated by the electric pen's contact (or approach), the user device 410 may sense the generated signal of the electric pen 430 based on the point at a certain location through the EMR circuit of the user device 410. In such a case, the user device 410 determines that the sensed event is an input event for the external input by the electric pen 430, and processes the input function according to the signal generated in the electric pen 430 at the input mode. Further, the user device 410 may sense the generated signal of the pad based on the area through the entire area of the EMR circuit of the user device 410 when the user device 410 contacts (or approaches) the pad 450. In such a case, the user device determines that the sensed event is a charge event for charging by the pad 450, and processes the charged function by receiving energy supplied from the pad 450.

Hereinafter, the method of performing the input mode and charge mode according to the event that the user device 410 is inputted as considered in the example of FIG. 4 will be described with reference to FIG. 5.

Figure 5:
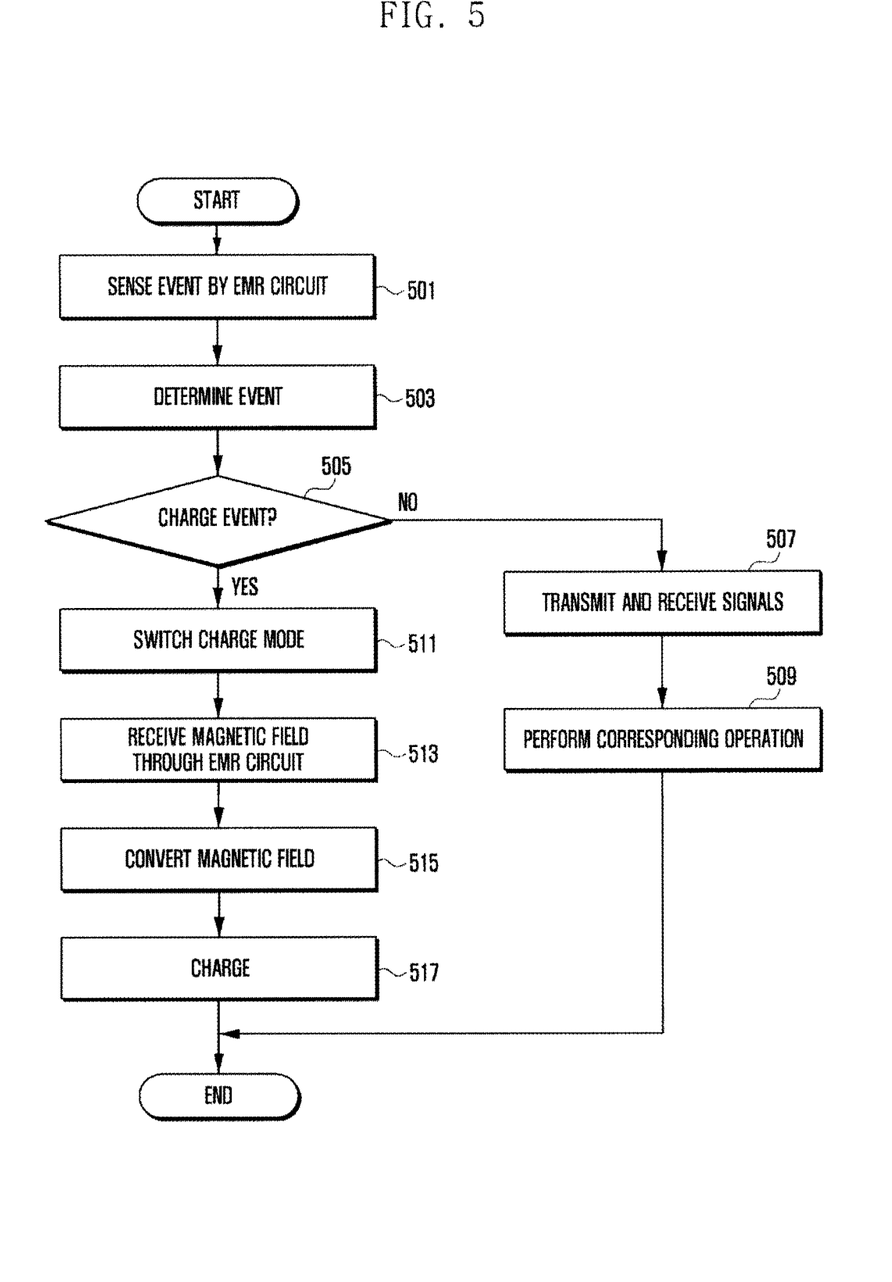
FIG. 5 is a flowchart illustrating a wireless charging operation in a user device according to an embodiment of the present invention.

FIG. 5 is a flowchart illustrating a wireless charge operation in a user device according to an embodiment of the present invention.

Referring to FIG. 4, the controller 280 may sense an event that an external device is contacted (or approached) by the EMR circuit (501). Then, the controller 280 determines the event (503), and determines the type, that is, whether the event corresponds to an input event for an input function or corresponds to a charge event for a charge function (505). That is, as described in the example of FIG. 4, the controller 280 may distinguish whether the event is an input event by the electric pen 430 using the EMR circuit or a charge event that requests the charge by the pad 450. Here, the controller 280 may distinguish the type of the event depending on whether the event is detected based on dots or based on the area through the EMR circuit.

If it is determined that the event is not a charge event (as indicated by No with respect to step 505), but an input event, the controller 280 may transmit and receive signals for a pen input with the electric pen 430 at the input mode (507), and process the performance of the operation according to the pen input (509). For example, the controller 280 may input and display characters on the display unit 230 in response to the pen input, or may execute a certain function (or application) and display the execution screen on the display unit 230 in response to the pen input. That is, if the event corresponds to the input event, the controller may distinguish the location of the electric pen 430 through the EMR circuit and process the data input according to the location.

If the event is a charge event (as indicated by Yes with respect to step 505), the controller 280 switches the mode to a charge mode (511), and receives the magnetic field generated in the pad 450 through the EMR circuit at the charge mode (513). Further, the controller 280 may process the internal charge (517) by converting the received magnetic field (515). That is, the controller 280 may receive the energy, which is generated in the contacted (or approached) pad 450 and is then wirelessly transmitted, through the EMR circuit. Further, the controller 280 may control the battery charge by converting the energy received through the EMR circuit into power for the battery charge. Here, the energy, which is supplied from the pad 450 and is stored as the magnetic field in the EMR circuit, is converted into the electric energy (flowing current), and the converted electric energy may be converted into a form that is useful to the user device.

Figure 6:
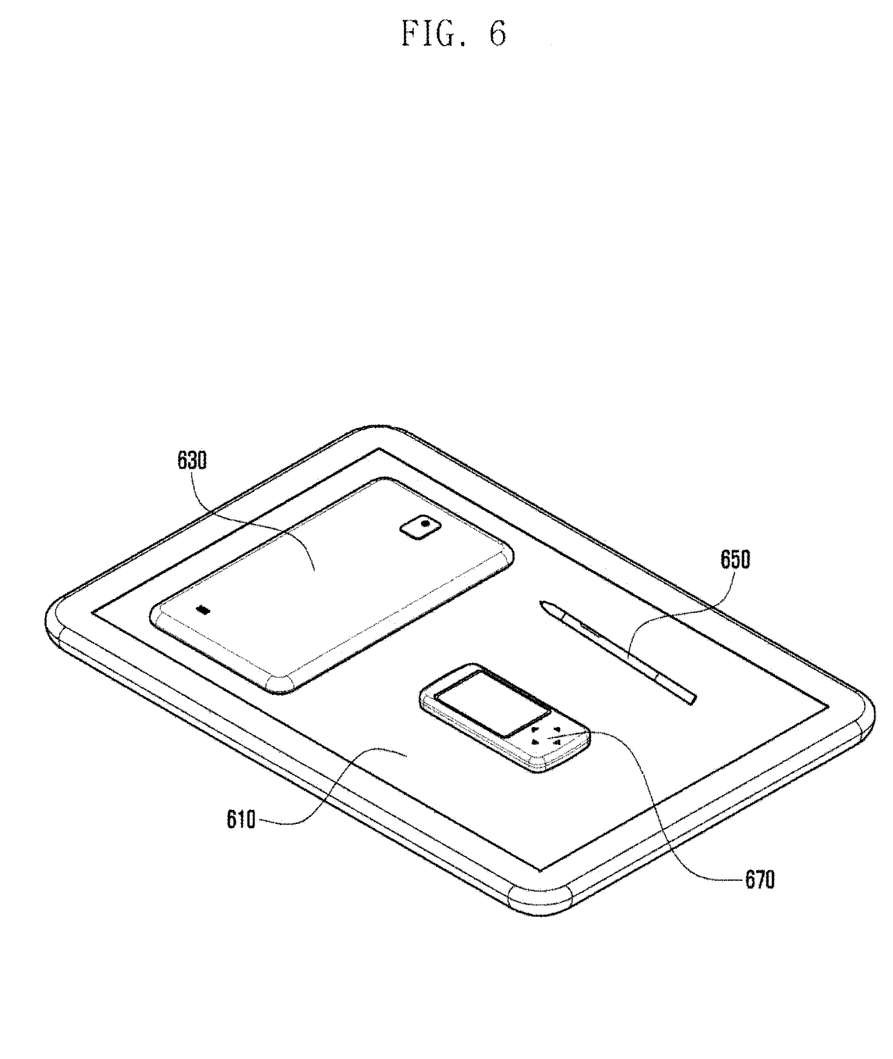
FIG. 6 illustrates a multi-charge operation in a user device according to an embodiment of the present invention.

FIG. 6 illustrates a multi-charge operation in a user device according to an embodiment of the present invention.

In particular, FIG. 6 illustrates an example of an operation that a user device supplies energy to a target device during the charging mode and supports the wireless charge of the target device, and illustrates an example of an operation of detecting the locations of a plurality target devices and performing a multi-charge by operating the area corresponding to the detected location as a valid charge area.

As illustrated in FIG. 6, the user device 610 according to an embodiment of the present invention may detect the location where the target device is placed through the charge unit 270 (particularly, the EMR circuit), and may support the wireless charge for the target device. Here, the device of reference numeral 610 may correspond to the first device 100 or the second device 200, and it is assumed in FIG. 6 that the device is a smartphone, a tablet PC or a pad (hereinafter, referred to as "user device") which generates and supplies energy for the wireless charge for a plurality of target devices. The devices of reference numerals 630, 650 and 670 may correspond to target devices, which contact the user device 610, receive energy supplied from the user device 610 and perform the internal charge, such as a smartphone, an electric pen, a media player and a personal digital assistant (PDA).

Referring to FIG. 6, when the user device 610 operates at a charge mode for the charge of the target device, the user device 610 may generate the magnetic field through the EMR circuit, and may wirelessly transmit the energy for the charge of the target devices 630, 650 and 670 by generating the generated magnetic field in a magnetic resonance scheme or magnetic induction scheme adopted in the present invention. At this time, the user device 610 may detect the location where the target devices 630, 650 and 670 exist, and may operate the charge area of the detected location as a valid charge area. Here, the locations of the target devices 630, 650 and 670 may be detected according to the technology of recognizing the location of the electric pen by the EMR that recognizes the location of the electric pen through the EMR circuit.

Further, the user device 610 may detect the location of the target devices 630, 650 and 670 in a scheme that scans the entire charge area including the EMR circuit. For example, when the electric current flows in the user device 610, the conductor, which forms the charged area in the EMR circuit, may have the electric current that flows in the same direction. Hence, the current flowing along the coil of the EMR circuit generates a magnetic flux, and the layer of the magnetic material of the EMR circuit may exist under the charged area that provides the return path of the magnetic flux.

Further, if the target devices 630, 650 and 670 are placed at an arbitrary location on the upper part of the charged area based on the EMR circuit, the magnetic flux generated through the EMR circuit of the user device 610 may flow through the EMR circuit of the target devices 630, 650 and 670 in the forward direction. That is, in the magnetic flux that flows through the coil of the EMR circuit of the user device 610, the electric current may be induced through the coil of the EMR circuit of the target devices 630, 650 and 670. Hence, in the case of an area where the target devices 630, 650 and 670 are placed on the upper part of the charged area of the user device 610, the magnetic flux density of the magnetic field generated by the mutual interference may be changed. That is, the user device may recognize the change of the magnetic flux density and detect the location where the target devices 630, 650 and 670 are placed.

Further, as illustrated in FIG. 6, in the user device 610 and the target device 630, the EMR circuit may be implemented in the front part of the device, in the target device 650 the EMR circuit coil may be coiled and implemented, or in the target device 670, the EMR circuit may be implemented at the rear part. That is, as illustrated in FIG. 6, when the target devices 630, 650 and 670 are charged, the EMR circuit of the user device 610 may be placed to face the EMR circuit implemented in each target device 630, 650 and 670 in consideration of the charge efficiency.

Hereinafter, the method of performing a charge mode of the user device 610 as explained through the example of FIG. 6 will be described with reference to FIG. 7.

Figure 7:
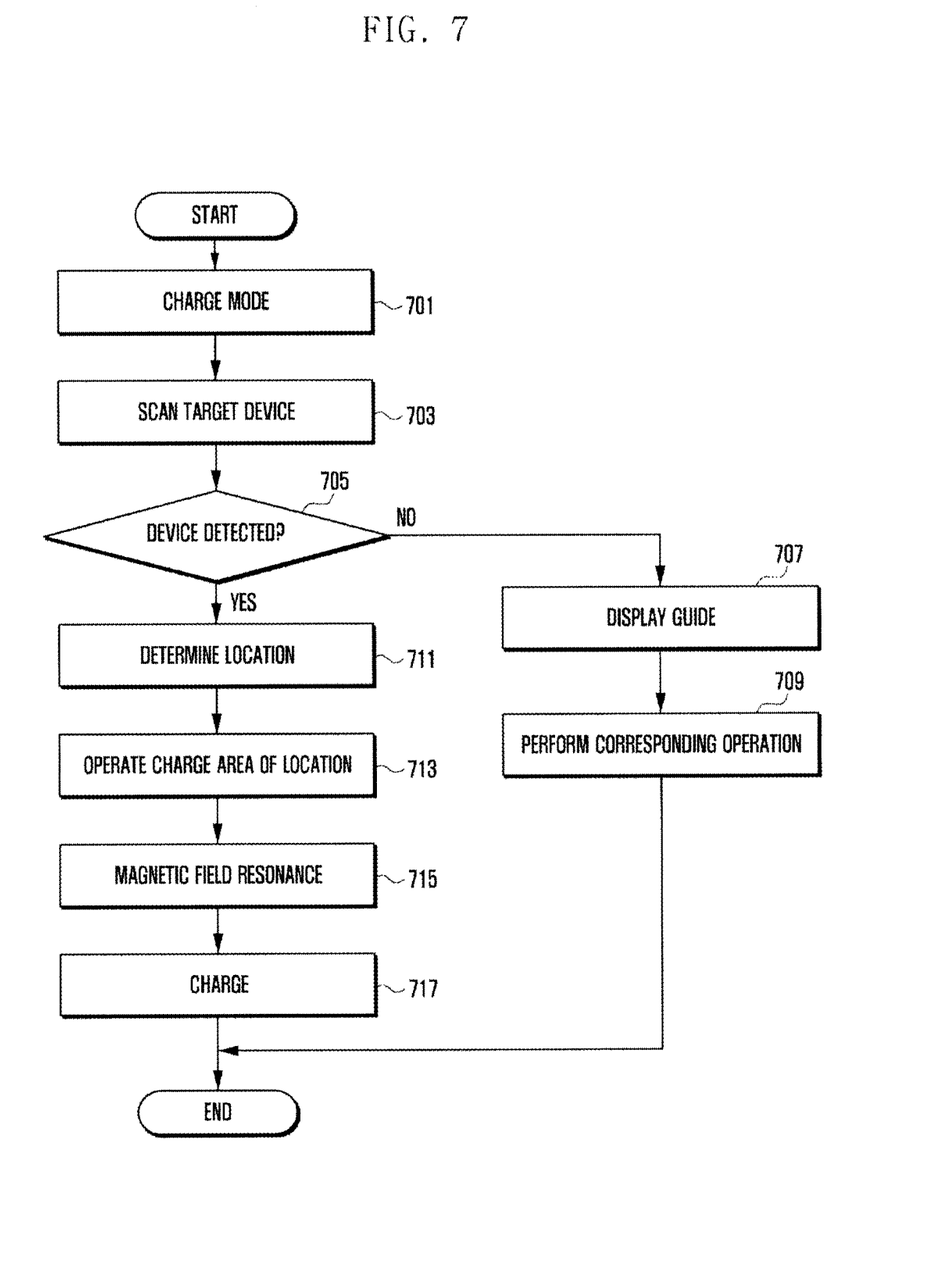
FIG. 7 is a flowchart illustrating a wireless charging operation in a user device according to an embodiment of the present invention.

FIG. 7 is a flowchart illustrating a wireless charge operation in a user device according to an embodiment of the present invention.

Referring to FIG. 7, when entering the charge mode (701), the controller 280 may perform the scanning for detection of at least one target device (703) so as to determine whether the target device has been detected (705). For example, the controller 280 may enter the charge mode when the activation of the charge mode (energy supply mode) for the wireless charging of the target device is requested by the user or the contact (or approach) of the target device is detected through the EMR circuit. Further, the controller 280 may detect the target device by the electric pen location recognition scheme or surface scanning scheme by the EMR as described above when entering the charge mode.

When the target device is not detected (as indicated by No with respect to step 705), the controller 280 controls the display of a guide for guiding the charge function on the display unit 230 (707) and then controls the performance of the operation (709). For example, the case where the target device is not detected may correspond to a case where the target device is not placed on the surface of the source device, the target device has approached the source device by a distance larger than the minimum threshold distance, user has placed the opposite surface where the EMR circuit has been implemented to touch the surface of the user device, or a part of the target device is placed at one edge of the source device. Hence, when the target device is not detected in the charge mode (energy supply mode), the controller 280 may control the display of the related UI and GUI that guides the target device to be placed at appropriate locations for the charge efficiency of the target device. Further, the controller 280 may control the performance of the operation including re-checking the location of the target device or terminating the charge mode and converting the mode into the previous mode in response to the user's input or after a certain time period passes after the guide display.

When the target device is detected (as indicated by Yes with respect to step 705), the controller 280 determines the location corresponding to at least one detected target device (711). That is, when at least one target device is detected through the scanning of the target device, the controller 280 may determine the charge area where the at least one detected target device exists in the entire charge area of the EMR circuit.

If the location for at least one target device is recognized, the controller 280 operates the charge area of the location (713). That is, the controller 280 may determine the area, where the target device exists in the entire charge area, as a valid charge area, and operate only the determined valid charge area in the EMR circuit.

The controller 280 controls generation of the magnetic field based on the valid charge area (715) and supports the external charge by transmitting the generated magnetic field to the target device through the EMR circuit (717) by the operation of the valid charge area. For example, if the valid charge area is determined, the controller 280 may control the path so that the electric current may be supplied to the valid charge area of the EMR circuit, and may control the generation of the magnetic field by the valid charge area. Further, the controller 280 may control the wireless charge of the target device by inducing the energy by the generated magnetic field to the target device in a magnetic resonance scheme or magnetic induction scheme.

As described above, according to an embodiment of the present invention, the controller 280 may support the charge by operating (i.e., generation of the magnetic field) only the charge area (valid charge area) of the location where the target device has been detected in the entire charge area of the EMR circuit that covers the entire surface of the user device. At this time, the controller 280 may respectively detect a plurality of locations for a plurality of target devices, and may support a multi-charge by operating a plurality of valid charge areas corresponding to the detected locations.

The foregoing embodiments of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention, and vice versa.

As described above, according to a method and apparatus of a device suggested in the present invention, when the charging of a user device that supports a pen input using an electromagnetic radiation (EMR) technology is required, a wireless charging may be conveniently supported without spatial or temporal restrictions using another user device even in a situation where power is not supplied. According to an embodiment of the present invention, the charging efficiency may be optimized while minimizing the performance deterioration of a target device by a magnetic field by supporting the wireless charging of the target device by operating only the valid charge area where the target device is placed.

Further, according to the present invention, even if the target device is not placed at a designated location to optimize the charging efficiency through a valid charge area corresponding to location of the target device, the optimal charging efficiency may always be maintained, and thus the user convenience may be improved. According to the present invention, the multi-charge may be supported regardless of the location where the target device is placed on the upper part of the user device. Thus, according to the exemplary embodiments, the multi-charge may be supported regardless of the direction or location of the target device is placed on the upper part of the user device by maintaining the charging efficiency through the valid charge area corresponding to location of the target device. That is, according to an embodiment of the present invention, one or more target devices may be simultaneously charged by securing a charging effective area (i.e., a valid charge area).

Further, according to an embodiment of the present invention, in a user device that supports a pen input using an EMR technology, a pen input operation by an electronic pen through an EMR circuit may be distinguished from the charge operation (internal charge and external charge) using the EMR circuit. Further, according to an embodiment of the present invention, the optimal charging efficiency is always maintained and thus the charging time may be minimized, and the design is not dedicated for a certain target and thus may be applied to various devices.

Hence, according to the present invention, the user convenience may be improved and the user device's usability, convenience and competitiveness may be improved by implementing an optimal environment for supporting wireless charge of the user device. The present invention may be simply implemented in all forms of user devices having a media content replay function and various devices corresponding to such a user device.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A wireless charging method of an electronic device having an electromagnetic radiation (EMR) circuit including one or more coils that store magnetic energy received from a magnetic field of a source device and converts the magnetic energy into electric energy to charge an internal battery of the electronic device, the method comprising:
   determining, by a controller of the electronic device, a mode of operation based on a user input signal sensed by the EMR circuit;
   controlling, when the controller determines the mode of operation is an input mode, execution of an input function according to the user input signal received through the EMR circuit in response to operation of the input mode; and
   controlling, when the mode of operation is a charging mode, a wireless charging of the internal battery of the electronic device using electric energy converted from magnetic energy stored in the one or more coils of the EMR circuit in response to the charging mode, wherein the mode of operation is determined based on a distribution of an area sensed by the EMR circuit.

2. The method of claim 1, wherein controlling the wireless charging comprises controlling a wireless charging of a target device or a wireless charging of the internal battery of the electronic device.

3. The method of claim 2, wherein controlling the wireless charging comprises determining a type of the charging mode, wherein the type of the charging mode includes an energy reception mode for charging the internal battery of the electronic device and an energy supply mode for charging the target device.

4. A computer-readable storage medium storing one or more programs comprising instructions which, when executed by an electronic device, cause the device to execute the method according to claim 1.

5. A wireless charging method of an electronic device having an electromagnetic radiation (EMR) circuit including one or more coils that store magnetic energy received from a magnetic field of a source device and converts the magnetic energy into electric energy to charge an internal battery of the electronic device, the method comprising:
   determining, by a controller of the electronic device, a mode of operation based on a user input signal sensed by the EMR circuit;
   controlling, when the controller determines the mode of operation is an input mode, execution of an input function according to the user input signal received through the EMR circuit in response to operation of the input mode; and
   controlling, when the mode of operation is a charging mode, a wireless charging of the internal battery of the electronic device using electric energy converted from magnetic energy stored in the one or more coils of the EMR circuit in response to the charging mode, wherein controlling the wireless charging comprises controlling a wireless charging of a target device or a wireless charging of the internal battery of the electronic device, wherein controlling the wireless charging comprises determining a type of the charging mode, wherein the type of the charging mode includes an energy reception mode for charging the internal battery of the electronic device and an energy supply mode for charging the target device, and wherein determining the type of the charging mode comprises distinguishing the type of the charging mode based on a distribution of an area sensed by the EMR circuit.

6. A wireless charging method of an electronic device having an electromagnetic radiation (EMR) circuit including one or more coils that store magnetic energy received from a magnetic field of a source device and converts the magnetic energy into electric energy to charge an internal battery of the electronic device, the method comprising:

determining, by a controller of the electronic device, a mode of operation based on a user input signal sensed by the EMR circuit;

controlling, when the controller determines the mode of operation is an input mode, execution of an input function according to the user input signal received through the EMR circuit in response to operation of the input mode;

controlling, when the mode of operation is a charging mode, a wireless charging of the internal battery of the electronic device using electric energy converted from magnetic energy stored in the one or more coils of the EMR circuit in response to the charging mode, wherein controlling the wireless charging comprises controlling a wireless charging of a target device or a wireless charging of the internal battery of the electronic device, wherein controlling the wireless charging comprises determining a type of the charging mode, wherein the type of the charging mode includes an energy reception mode for charging the internal battery of the electronic device and an energy supply mode for charging the target device, and wherein determining of the type of the charging mode comprises:

determining the charging mode as the energy reception mode when a distribution of an area sensed by the EMR circuit is detected in an entire area of the EMR circuit; and determining the charging mode as the energy supply mode when the distribution of an area sensed by the EMR circuit is detected in only a portion of the EMR circuit.

7. The method of claim 6, wherein the controlling of the wireless charging comprises:

entering, when the charging mode is the energy reception mode, the charging mode for receiving energy supplied from the source device using the EMR circuit in response to the energy reception mode;

receiving a magnetic field induced from the source device through the EMR circuit during the charging mode;

converting the received magnetic field into electric energy; and charging the internal battery of the electronic device by the converted electric energy.

8. The method of claim 6, wherein controlling of the wireless charging comprises:

entering, when the charging mode is the energy supply mode, the charging mode for supplying energy to the target device in response to the energy supply mode;

determining a valid charging area for a charging of the target device during the charging mode; and generating a magnetic field on the determined valid charging area.

9. The method of claim 8, wherein the determining of the valid charging area comprises:

detecting a location where the target device is placed on the entire area of the EMR circuit;

determining an area corresponding to the location of the target device as the valid charging area; and supplying a driving current to the valid charging area.

10. The method of claim 9, wherein detecting the location of the target device is achieved by a pen location recognition scheme or a surface scanning scheme by the EMR.

11. The method of claim 9, further comprising:

displaying a guide interface guiding the target device to be placed on the area of the EMR circuit when the target device is not detected.

* * * * *